United States Patent [19]

Mučic

[11] Patent Number: 4,780,967
[45] Date of Patent: Nov. 1, 1988

[54] APPARATUS FOR THE RECOVERY OF WASTE HEAT CONTAINED IN THE EXHAUST FROM DRYERS OF PAPER MACHINES

[75] Inventor: Vinko Mučić, Walldorf, Fed. Rep. of Germany

[73] Assignee: TCH Thermo-Consulting-Heidelberg GmbH, Heidelberg, Fed. Rep. of Germany

[21] Appl. No.: 135,159

[22] PCT Filed: Apr. 2, 1987

[86] PCT No.: PCT/EP87/00179
§ 371 Date: Nov. 24, 1987
§ 102(e) Date: Nov. 24, 1987

[87] PCT Pub. No.: WO87/06284
PCT Pub. Date: Oct. 22, 1987

[30] Foreign Application Priority Data
Apr. 17, 1986 [DE] Fed. Rep. of Germany ....... 3612907

[51] Int. Cl.$^4$ .......................... D21F 5/20; F25B 25/02
[52] U.S. Cl. ...................................... 34/86; 62/238.3; 62/476; 162/375

[58] Field of Search ............... 34/35, 86; 162/47, 375, 162/381; 62/238.3, 476

[56] References Cited

U.S. PATENT DOCUMENTS 4,314,668  2/1982  Jansen et al. ........................ 62/238.3
4,420,942  12/1983  Rojey et al. ........................... 62/476

FOREIGN PATENT DOCUMENTS 2102550  2/1983  United Kingdom .
82/02939  9/1982  World Int. Prop. O. .

Primary Examiner—David L. Lacey
Assistant Examiner—K. M. Hastings

[57] ABSTRACT

Method and apparatus for drying paper webs continuously manufactured in paper machines, by the use of process steam produced by a two-substance compression heat pump with a solution-circuit.

A portion of the thermal energy needed for the drying process is obtained from process steam produced by the heat pump from the waste heat contained in the moist exhaust air of the paper machine, and another portion from preheated ambient air, which is then used for drying the paper web. The ambient air is preheated by using it to cool the rich solution of the heat pump.

9 Claims, 5 Drawing Sheets

APPARATUS FOR THE RECOVERY OF WASTE HEAT CONTAINED IN THE EXHAUST FROM DRYERS OF PAPER MACHINES

The invention relates to an apparatus for the recovery of waste heat contained in the exhaust from dryers of paper machines by means of a compression heat pump fed with the exhaust air on its low-pressure side, by which feed water process steam is produced on the high-pressure side for heating the drying cylinder, and air, which then is used for the drying, is preheated.

In the manufacture of paper in paper machines, the originally relatively watery fiber pulp is first compressed to form the fiber mat, and then dewatered by vacuum aspirators and by couch rolls, and finally in the press part by a series of wet presses. The residual moisture is then removed in the drying part of the paper machine, which is formed by a series of cylinders arranged in a drying chamber and heated with low-pressure steam at temperatures of about 140° to 150° C. The process steam for heating the drying cylinders has heretofore been produced in practice in low-pressure steam boilers fueled with fossil fuels, unless steam is available from other sources, such as the production of electricity. The warm exhaust air of high relative humidity produced by the drying has heretofore been emitted to the ambient atmosphere, which is wasteful of energy on the one hand, and on the other hand can pollute the environment by forming noxious vapors or fogs, especially in the case of cold outdoor temperatures.

Therefore, both for the sake of saving energy and of reducing environmental pollution, there is a need to recycle the thermal energy still contained in the warm, moist exhaust air back into the papermaking process, and thus avoid the described disadvantages. Heat pumps of themselves are suitable to a special degree for the use of exhaust heat at a relatively low temperature level, and proposals have already been disclosed for the transfer of the exhaust heat contained in the exhaust from the drying chamber to the blowing air to be fed to the drying chamber for drying purposes, by means of a compression heat pump (DE-OS 26 30 853). The use of compression heat pumps for the production of process steam from feed water for the heating of the drying cylinders and for warming the blowing air has already been described theoretically (article: "Eine Betrachtung ueber die Einsatzmoeglichkeiten von Waermepumpen bei der Papiertrocknung" by J. Kappel, F. Schweinzer and A. Weinmann in "Wochenblatt fuer Papierfabrikation" 7, 1984, pp. 133–238). However, only the use of single-substance compression heat pumps was considered, which, in order to realize a sufficient temperature elevation of the waste heat occurring at relatively low temperature, had to be formed by two compression heat pumps connected in tandem, at least when, in addition to the warming of the blowing air, steam is also to be produced for heating the drying cylinders. In the tandem heat pumps it is then necessary to operate with different working media suitable for the particular temperature range, which leads to a complex system. In the article cited, it is pointed out by the authors that the study concerning the various working media that might be used has found no thermodynamically optimum medium. In their findings, the authors therefore come to the conclusion that the use of closed compression heat pumps with electric motor drive is basically possible, but not economical at the dryer dew points presently in use.

In the manufacture of paper, furthermore, problems occur because of certain operating conditions which make it difficult to use heat pumps for the production of the process steam required for heating the drying cylinders. Due to production-related effects, a breakage of the paper in the machine often occurs, making it necessary to shut down the paper machine briefly until the paper is re-introduced into the machine. During this down time, however, no paper drying takes place, so that there is also no waste heat available from exhaust air for the evaporator of a single-substance heat pump. Upon restarting the paper machine, the heat pump would then be unable to supply steam, so that the continued operation of the machine is possible only if, at least for a certain transitional period of time, steam is available from another source for heating the drying cylinder. This problem is aggravated when the paper machine is restarted after a relatively long down period, e.g., after overhauls or repairs. Investment in a low-pressure steam boiler only for starting up a stopped paper machine, however, would then be no longer feasible, even considering the energy savings achievable by means of the heat pump. Lastly, then, the paper fibers and other impurities contained in the exhaust air from the drying zone of the paper machine constitute a problem, since they necessarily lead to the contamination of the evaporator surfaces to which the exhaust air is to be fed.

The invention, on the other hand, is addressed to the problem of making economical use of the waste heat contained in the moist exhaust air produced in the drying part of paper machines, by means of a compression heat pump in a manner leading to great energy savings. At the same time it is to be fundamentally possible to dispense with using additional external steam sources for heating the drying cylinders when restarting a briefly shut-down paper machine.

Setting out from a plant of the kind described in the beginning, this problem is solved according to the invention in that the heat pump is in the form of a two-substance compression heat pump with a heat exchanger inserted into the sections on the high-pressure side of the lines carrying the rich and the poor solution, that the side of the degasser of the heat pump that is to be fed with the waste heat-containing exhaust is inserted into the line carrying the moist exhaust air from the dryer, and the water vapor outlet of the resorber is connected by a process steam line to the process steam inlet of the dryer of the paper machine; that at least one heat exchanger is inserted into the section of the line carrying the rich solution from the resorber to the degasser, which runs between the heat exchanger and the section running to the throttle member, in which the rich solution is cooled by the air which is then used for the drying; that from the section of the line carrying rich solution and situated between the resorber and the heat exchanger, a rich solution branch is taken and is returned to the section of the line that runs between the heat exchanger and the throttling means, and that at least one additional heat exchanger is inserted into the branch line and is connected in series to the output of the at least one heat exchanger as regards being swept by ambient air which is then used for the drying. By the use of a two-substance heat pump of this construction, both the performance figure of the heat-pumping process and the preheating of the air used for the subsequent drying are optimized, i.e., the investments in the heat-pump installation pay for themselves comparatively quickly.

If a volume of air exceeding the necessary amount of the drying air were necessary for the optimum cooling of the rich solution, it would be recommendable to provide a system for the injection of water into the part of at least the first heat exchanger through which ambient air then used as drying air flows. The necessary cooling is then achieved with a reduced volume of air flow, as a result of the heat required for the evaporation of the injected water. Furthermore, the saturation temperature of the exhaust air is increased, so that degassing can be performed on the secondary side at a higher temperature, i.e., at comparatively higher pressure, thereby reducing the power required for driving the compressor of the heat pump.

A further improvement of the heat pump process is achieved with regard to the necessary compressor driving power with the simultaneous possibility of preheating ambient air to be used for the drying, by a further development in which either one compressor of at least two stages, or at least two single-stage compressors are inserted in tandem into the line carrying to the resorber the gaseous working agent component driven out in the degasser, while after the first and before the last stage of the multistage compressor, or after the first and before the last compressor, at least one heat exchanger is inserted into the line carrying the gaseous working agent component and is constructed such that ambient air then used for the drying can flow through it to cool the gaseous working agent component.

Instead of or in addition to the intermediate cooling of the gaseous working agent component, two solution pumps can be disposed in tandem in the line carrying poor solution from the degasser to the resorber, while a heat exchanger, through which the ambient air subsequently used for the drying flows as coolant, is inserted in the section of the line between the solution pumps, and to the part of that heat exchanger through which the poor solution flows there is also connected one end of a branch line whose other end is connected to the line carrying the gaseous working agent component between the stages of the multi-stage compressor or between the compressors, as the case may be. Thus, gaseous working agent component can pass over into the part of the heat exchanger through which the poor solution flows, and can be resorbed in the poor solution, yielding resorption heat at a pressure below the pressure of the main resorber of the heat pump.

The problem of making process steam available immediately upon restarting a paper machine that has been momentarily shut down due to paper tearing is solved, in a further development according to the invention, by the fact that a branch line carried to the exhaust-air side of the degasser is connected to the process steam line, and control means are provided in the branch line for switching to the branch line the steam fed into the process steam line, in the event of a brief stoppage of the paper machine. In the event of a brief shut-down of the paper machine due to paper breakage, the heat pump can therefore continue to be operated, in which case the process steam produced from the feed water in the resorber is then used, not to heat the drying cylinder, but to degas the two-substance working agent. Upon the restarting of the machine, therefore, process steam is immediately available for heating the drying cylinder.

The control means can then, in an advantageous further development of the invention, be formed by an overflow valve inserted in the branch line and operated by the steam pressure which rises in the process steam line when the steam feed to the paper machine is shut off.

In order to assure the cleaning of the degasser surfaces over which the exhaust air or the water vapor is to pass, the embodiment is preferably made such that, within the jacket space of the degasser of the heat pump, a plurality of substantially uniformly distributed steam nozzles connected to the branch line are set opposite and in close proximity to the surfaces that are to be cleaned, which then, in the event of a brief shut-down of the paper machine due to a paper break, direct against the surfaces to be cleaned a plurality of cleaning jets of the steam carried through the degasser, and thus blow these surfaces free of any adhering impurities that interfere with the transfer of heat.

The starting up of the plant according to the invention after a lengthy shut-down of the paper machine, in which the heat pump has been shut off, is made possible by an embodiment in which a heater unit, heated with natural gas, light heating oil or any other fossil fuel, is provided for heating the ambient atmosphere to be fed to the degasser. Then, when the paper machine is started up, this heated air is used for degassing two-substance working agent until waste heat is available from the restarted paper machine.

The invention is further explained in the following description of embodiments in conjunction with the drawing, wherein.

Figure 5:
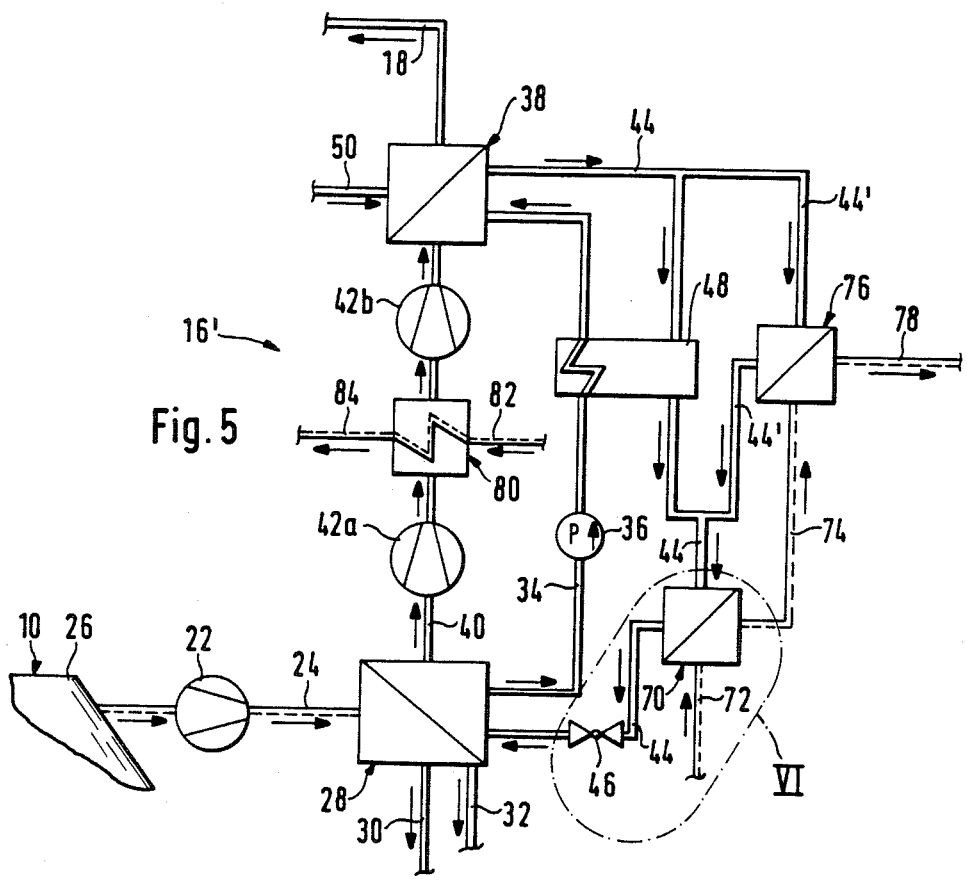
FIG. 5 is a diagrammatic plan of an embodiment of the two-substance compression heat pump constructed in the manner of the invention, with a solution circuit, showing possibilities for cooling the rich solution with heat exchangers with simultaneous preheating of ambient air then used for the drying.
Figure 6:
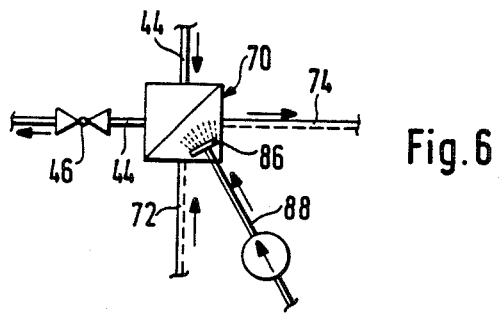
Figure 7:
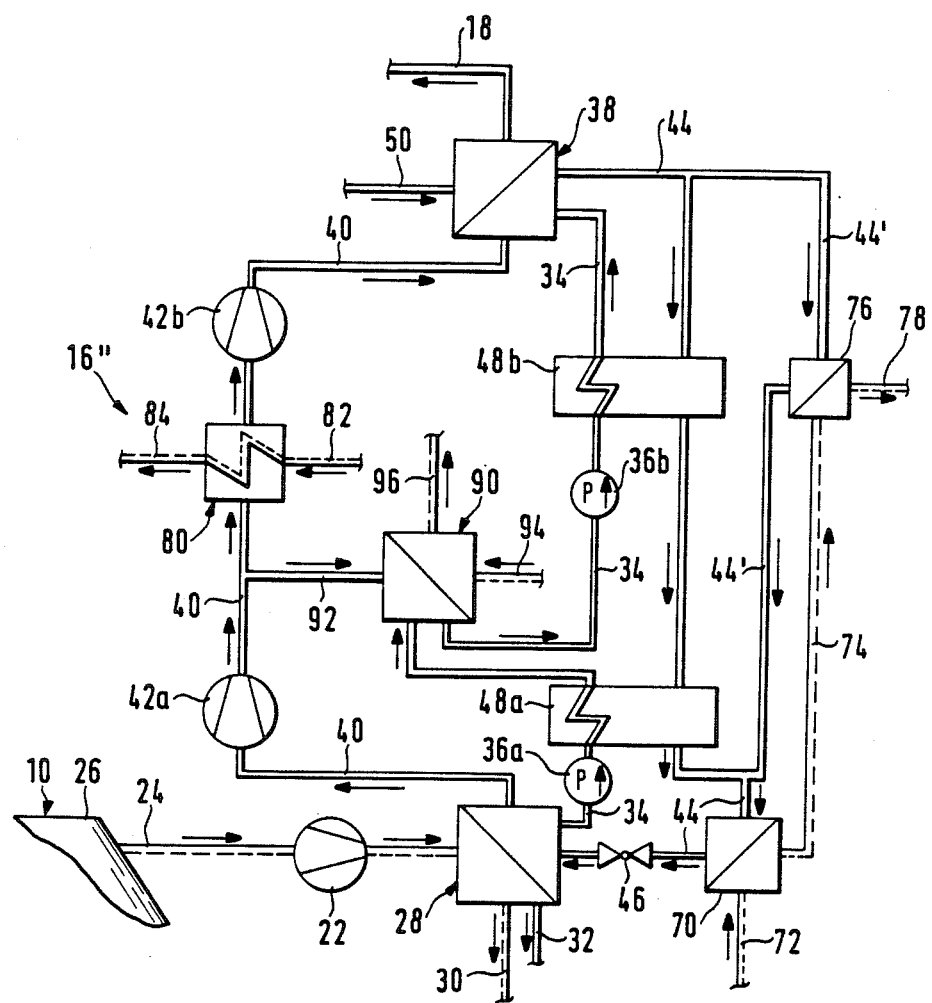

FIG. 6 shows the portion within the broken line 6 [VI]in FIG. 5, of the circuit of the two-substance compression heat pump, additionally showing diagrammatically the possibility of the injection of water into the part of a heat exchanger for cooling the rich solution, through which the ambient air that is to be preheated flows, and FIG. 7 is a diagrammatic circuit diagram of a two-substance compression heat pump improved in comparison to the heat pump shown in FIG. 5.

The drying section 10 of the paper machine is shown merely diagrammatically in the form of a closed chamber in which the previously dewatered paper web 12 is passed over a number of heated cylinders 14 and dried.

The low-pressure process steam serving to heat the cylinders 14 is produced in a two-stage compression heat pump indicated as a whole by the number 16 represented at first in a simplified position for the sake of ease in comprehension, and is fed to the cylinders 14 through a process steam line 18. The condensate forming in the cylinders is removed through a common condensate drain line 20 connected to the cylinders.

Figure 1:
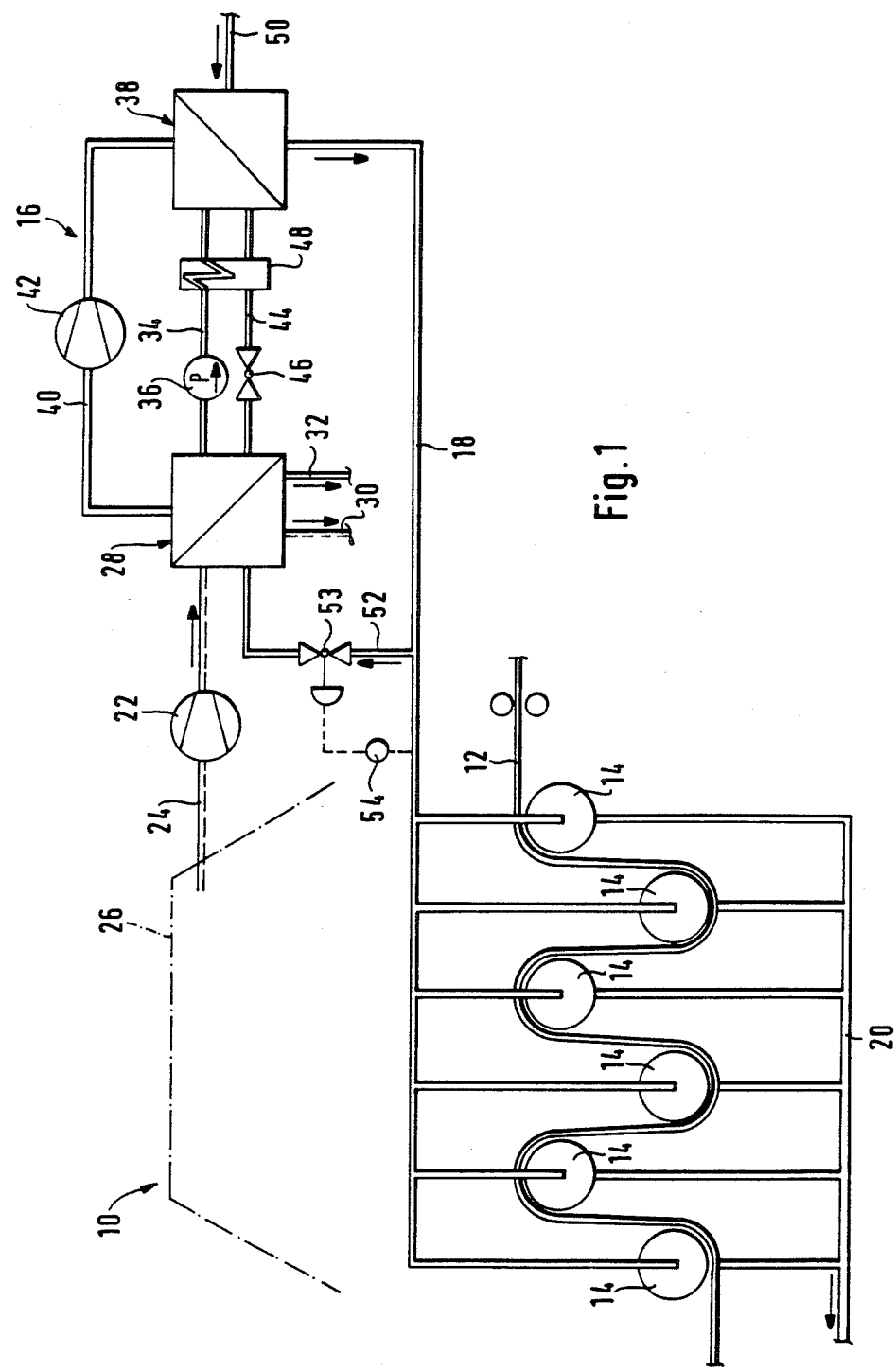
FIG. 1 is a diagrammatic plan of an apparatus utilizing the waste heat contained in the moist exhaust issuing from the drying zone of a paper machine for the production of steam by means of a two-substance compression heat pump, the means for the additional preheating of the drying air having been omitted for the sake of simplicity.
Figure 2:
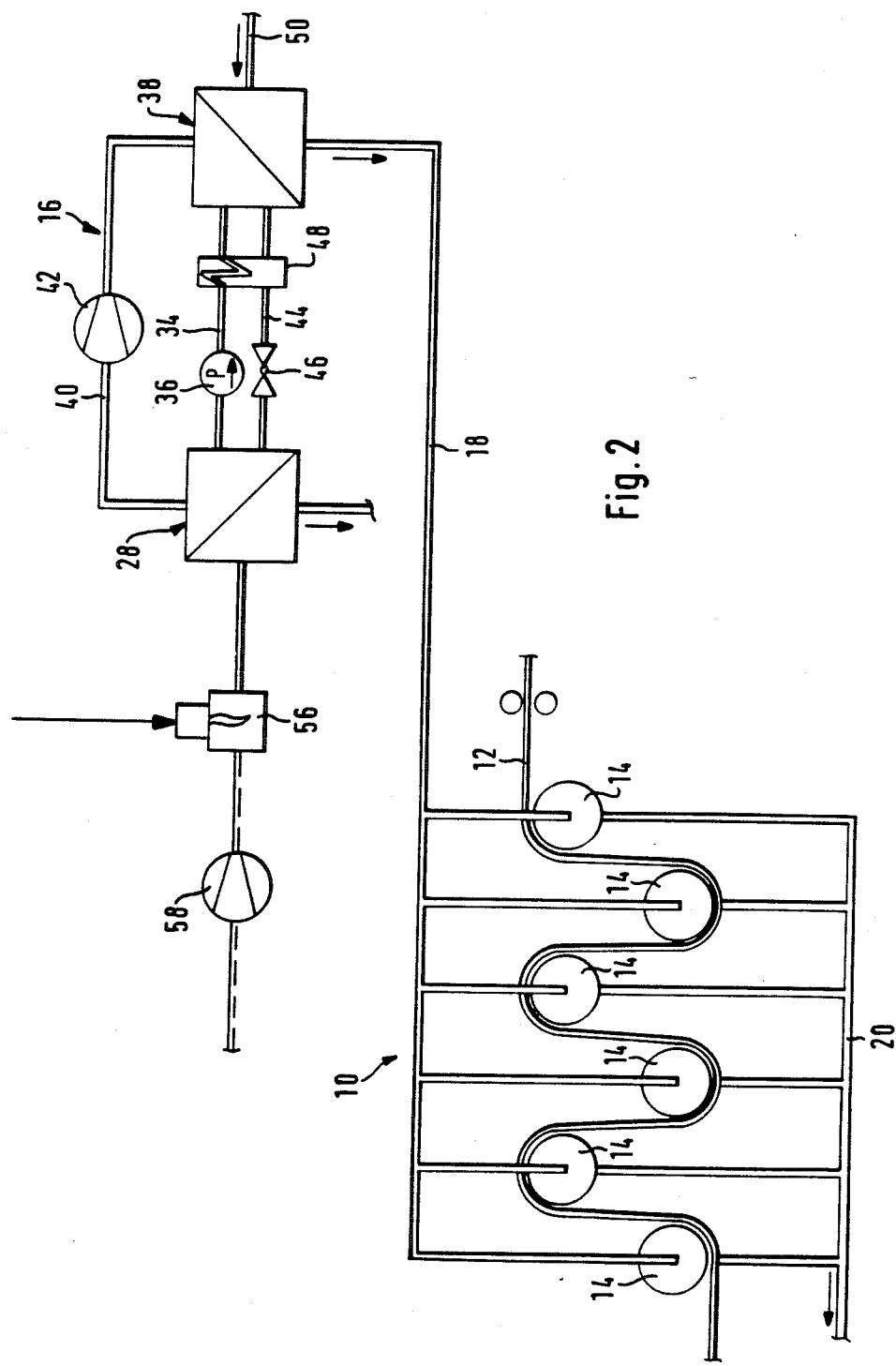
FIG. 2 is a plan corresponding to FIG. 1 of the apparatus when it is being started after a comparatively long period of inactivity.

The moist exhaust that develops, by absorption of the moisture driven out of the paper web during the drying of the paper web 12, from the ambient air delivered to the drying zone and preheated in the manner to be further explained below in conjunction with FIGS. 5 and 7, is aspirated out of the paper machine hood 26 terminating the drying area at the top, through a duct 24 provided with an aspirating blower 22, and is delivered into the degasser 28 of the heat pump 16, in which, by means of the waste heat which it contains, one component of the two-substance working agent, e.g., ammonia, is driven in gaseous form out of the rich solution formed from an ammonia and water mixture used as the heat pump working agent. The exhaust air thus cooled passes out of the degasser through a duct 30 into the ambient atmosphere, while the condensate that forms in the cooling is carried out through a condensate drain line 32. In the two-substance compression heat pump 16, which is represented in FIGS. 1 and 2 in a simplified manner in its main components, the poor solution formed by driving off ammonia in the degasser 28 provided on the low-pressure end is pumped through a line 34 by a solution pump 36, which raises its pressure, to the resorber 38 provided on the high-pressure end. The component of the working agent, i.e., the ammonia, that is driven off in gaseous form in the degasser 28 is delivered on the other side, with an increase in pressure, by means of a compressor inserted into a line connecting the degasser to the resorber 38, where it is again resorbed, while the resorption heat is carried out in the solution. The solution, then rich again, flows through a line 44 back to the degasser 28, while the pressure n the rich solution is lowered by a throttle valve 46 inserted into line 44. Then, heat is again absorbed from the ambient air in the degasser and ammonia is driven in gaseous form out of the rich solution. It is then desirable to insert into lines 34 and 44 of the solution circuit the heat exchanger 48 commonly used in two-substance compression heat pumps.

In the resorber 38 the resorption heat is transferred to feed water fed through a line 50, which is evaporated and then injected with a pressure of 3 bar or more into the process steam line 18 as low-pressure process steam. The temperature of the steam entering the cylinders 14 may then amount to 140° to 150° C, which corresponds to the temperature of the process steam of conventional paper machines.

The jacket space of the degasser is additionally connected by a branch line 52 to the process steam line 18, the entry of process steam into the degasser being prevented by an overflow valve 53 inserted into the branch line and normally closed. If the paper machine has to be shut down briefly because of a tear in the paper web 12, i.e., if the feeding of steam to the cylinders 14 has to be shut off, the overflow valve 53 is opened by a control 53 sensing the pressure elevation in the process steam line 18, and the process steam produced in the resorber is thus fed through the degasser. The heat pump, therefore, can continue to operate constantly without the need for an additional source of steam. When the paper machine is restarted, process steam is thus immediately available for heating the cylinders 14, simply by opening the feed of the process steam line 18 to the cylinders and thereby closing the overflow valve 53.

When the paper machine is first started up, or when it is started after a relatively long shut-down with the heat pump turned off, no process steam is available. In this case a possibility for the production of process steam by means of the heat pump 16 is represented in FIG. 2. This possibility consists in feeding the degasser 28 air aspirated from the ambient atmosphere by a blower 58 and heated in an additional burner 56 fueled by natural gas or light heating oil prior to the actual start-up of the paper machine. This air is fed into the degasser instead of moist exhaust air. Then, as soon as the paper machine is restarted, moist exhaust air is again available from the drying section, the burner 56 can be shut off, and the plant is again operated in the manner described above.

Figure 3:
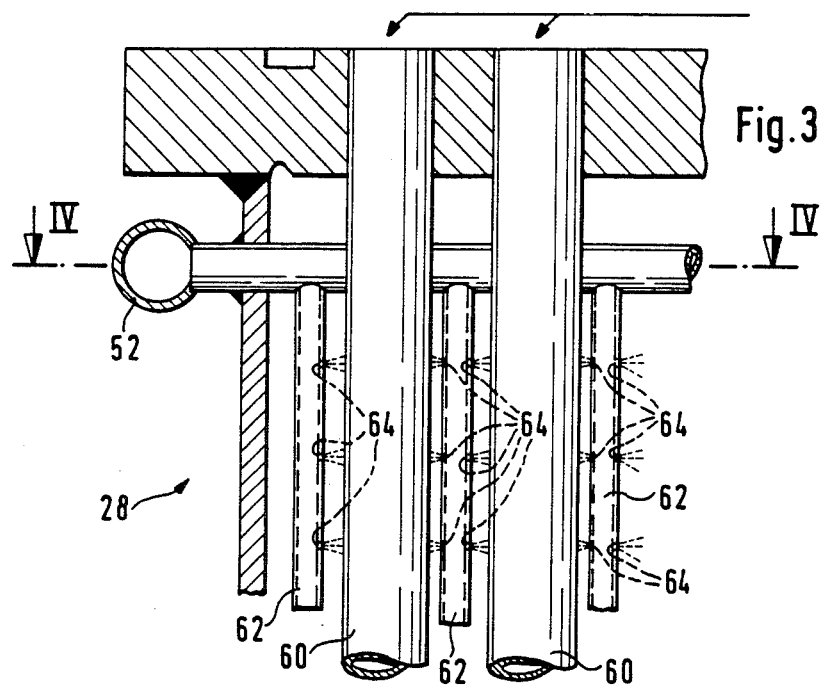
FIG. 3 is a fragmentary cross section through a portion of the degasser of the two-substance compression heat pump used in the apparatus.
Figure 4:
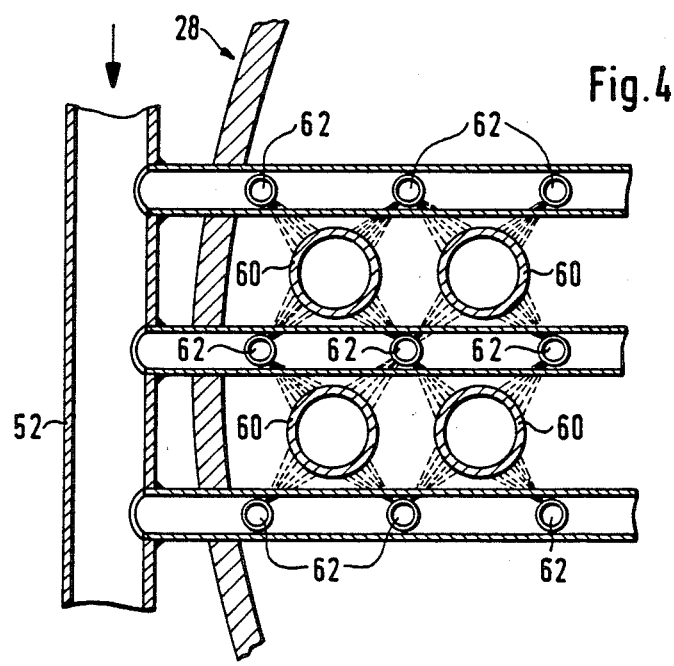
FIG. 4 is a fragmentary cross section through the same portion of the degasser, as seen in the direction of the arrows 4—4 in FIG. 3.

A configuration of the degasser 28 is represented in FIGS. 3 and 4, which makes it possible, by means of the process steam fed into the degasser during a brief stoppage of the paper machine, not only to continue the degassing of the rich solution, but also at the same time to remove any contaminated coatings from the heat-transfer surfaces formed on the outside of a plurality of tubes 60 through which the solution flows in the jacket space of the degasser. For this purpose, a system of steam blowing tubes 62 connected to the branch line 52 is disposed closely adjacent to the tubes 60; these steam blowing tubes are provided at uniform intervals with a plurality of nozzle holes 64 from which the steam fed while the paper machine is shut down due to paper tear is blown onto corresponding areas of the tubes 60. The number and arrangement of the nozzle holes 64 is selected such that the entire exterior surface of tubes 60 is blown clear and thus cleaned by the directed steam blast.

FIG. 5 presents the circuit diagram of a two-substance compression heat pump 16' which is improved in the manner of the invention in many ways over the plant diagrammed in FIG. 1 especially in regard to the drying function. In its basic construction, the heat pump 16' is the same as heat pump 16, so that it will be sufficient to describe only the actual improvements which are made in heat pump 16' over the heat pump 16 represented in a simplified manner, inasmuch as equal parts of the two heat pumps are given the same reference numbers in the drawing.

It can be seen that a heat exchanger 70 is inserted into the section of the line 44 carrying the rich solution, [at a point] between the throttling means 46 and the heat exchanger 48, and on the other side air aspirated from the ambient atmosphere can flow through it through a line 72 and can cool the solution flowing in line 44 and then enter into a duct 74.

Also, a branch line 44' is taken from the section of line 44 situated between the heat exchanger 48 and the resorber 38 and returns into line 44 [at a point] following the heat exchanger 48 and ahead of the throttle means 46. In the branch line 44' an additional heat exchanger 76 is inserted which is connected on the secondary side to the duct 74. The air already preheated in heat exchanger 70 therefore is used again in heat exchanger 76 to cool a part of the rich solution, and then, being thus warmed, issues from the heat exchanger 76 through a duct 78.

Duct 78 is then to be imagined as being prolonged into the drying section 10 which is in the form of a chamber. That is to say, the ambient air used for cooling the rich solution in the heat exchangers 70 and 76 and thus preheated in steps, is used as drying air. In this manner the energy that is to be put into the cylinders 14 heated with process steam for the drying operation is reduced accordingly, i.e., it is possible to operate with process steam of lower temperature, or, if the temperature of the process steam is not lowered, the drying rate increases.

In addition to the measures described above, in the case of the heat pump 16' the compressor 42 delivering the gaseous working agent component with an elevation of pressure from the degasser 28 to the resorber 38 is divided into two compressors 42a, 42b, which increase the pressure in steps. Between the compressors 42a and 42b a heat exchanger 80 is inserted into the line 40 carrying the gaseous working agent component for the intermediate cooling of the gaseous working agent component by means of ambient air delivered through a duct 82 to the heat exchanger and then, after preheating, is advanced through duct 84 into the drying section 10 as drying air.

In FIG. 6, furthermore, there is shown a possibility for reducing the amount of air required for cooling the rich solution in the heat exchangers 70 and 76, which consists of a system 86 for the injection of water fed through a feed line 88, into the part of the heat exchanger 70 through which the air flows. This possibility is best utilized when the amount of drying air required in the drying section 10 of the paper machine is not sufficient to cool the rich solution in the heat exchangers 70 and 76 to the desired extent. In addition to the cooling of the rich solution, intensified by the water injection, the saturation temperature is raised in the drying air, and thus the exhaust air delivered from the drying section 10 to the degasser 28 is augmented, so that the degassing can be performed on the secondary side at a higher temperature, i.e., higher pressure. The compressor power of the heat pump thus becomes correspondingly lower.

Lastly, in FIG. 7 there is shown a diagram of a two-substance compression heat pump 16' with solvent circuit, in which, in addition to the measures described in conjunction with the heat pump 16', a resorption of a portion of the gaseous working agent component driven out in the degasser 28 is performed at a pressure in the poor solution that is lower than the pressure prevailing in the resorber 38. For this purpose two solution pumps 36a and 36b are disposed in tandem in the line 34 carrying the poor solution from the degasser 28 to the resorber 38, and in the section of line 34 between these solution pumps there is inserted a heat exchanger 90 in which the part through which the poor solution flows is connected by a branch line 92 to the line 40 carrying the gaseous working agent component, namely in the section running between the compressors 42a and 42b. That is to say, gaseous working agent components that are at an intermediate pressure can pass over into the part of the heat exchanger 90 through which the solution is flowing, where it is resorbed in accordance with the average pressure prevailing. The resorption heat that develops is reused to preheat the ambient air fed as drying air from the heat exchanger 90 through a duct 94 and then through a duct 96 into the drying section 10 of the paper machine.

The step-wise pressure elevation in the line 34 carrying the poor solution by two solution pumps 36a and 36b then also suggests the use of two heat exchangers 48a and 48b instead of the heat exchanger 48 provided in the preceding system.

Lastly, it is also to be noted that, in the representation of the two-substance compression heat pumps 16, 16' and 16" used in the plant according to the invention are shown in the drawing only to aid in the comprehension of the operation of important basic components, while auxiliary units, such as motors for the compressors, the exhaust air aspirating blower, feed water pumps or blowers for feeding the ambient air to be heated in the heat exchangers, as well as the measuring, controlling and regulating means necessary for th operation of the plant, have been omitted for the sake of easier comprehension.

I claim:

1. In combination with a dryer of a papermaking machine, an apparatus for recovery of waste heat in moist exhaust air from the dryer, said apparatus comprising: a compression heat pump having a low-pressure side to which the exhaust air is fed, and a high-pressure side to which feed water is fed from which process steam is produced for heating the dryer, said heat pump being a two-substance compression heat pump including a degasser, a resorber, and three conduits interconnecting said degasser and said resorber; a first and second one of said conduits carrying a poor solution from said degasser to said resorber; a third one of said conduits carrying a rich solution from said resorber to said degasser, a first heat exchanger inserted into high-pressure-side sections of said second and third conduits, respectively; said degasser being connected to a duct for feeding the moist exhaust air thereinto from the dryer; said resorber having a steam outlet connected to a process steam line to an inlet of the dryer; at least one second heat exchanger in a section of said third conduit between said first heat exchanger and throttling means, in said section the rich solution is cooled by ambient air which is heated and fed to said dryer; means for supplying said ambient air to said first heat exchanger and means for feeding said heated air to said dryer; a first branch line for the rich solution extending from a section of the conduit between the resorber and said at least one second heat exchanger and back into said section of the conduit between the heat exchanger and the throttling means, and at least one third heat exchanger in said branch line and connected, as regards flow of the ambient air to said dryer, in series with the at least one second heat exchanger by means for feeding said heated air from said first heat exchanger to said second heat exchanger.

2. The combination according to claim 1, comprising a system for injecting water into said at least one second heat exchanger through which ambient air flows that is then fed to the dryer.

3. The combination according to claim 1, comprising a compressor of at least two stages in said first conduit, and at least one fourth heat exchanger in said first conduit, at a point following a first and preceding a last stage of the compressor and constructed for passage therethrough of ambient air to be fed to the dryer.

4. The combination according to claim 1, comprising at least two single stage compressors arranged in tandem in said first conduit, and at least one fourth heat exchanger in said first conduit, at a point following a first and preceding a last one of said compressors, and constructed for passage therethrough of ambient air to be fed to the dryer.

5. The combination according to claim 3 or 4, comprising two solution pumps disposed in tandem in said second conduit, and a fifth heat exchanger in a section of said second conduit between the two solution pumps, through which on one side ambient air flows as coolant which is then fed to the dryer and through which on the other side the poor solution flows, a second branch line opening into said other side and connected to said first conduit, gaseous working agent overflowing into the other side and being resorbed at a pressure in the poor solution that is below the pressure of the resorber.

6. In combination with a dryer of a papermaking machine, an apparatus for recovery of waste heat in moist exhaust air from the dryer, said apparatus comprising: a compression heat pump having a low-pressure side to which the exhaust air is fed, and a high-pressure side to which feed water is fed from which process steam is produced for heating the dryer, said heat pump being a two-substance compression heat pump including a degasser, a resorber, and three conduits interconnecting said degasser and said resorber; a first and second one of said conduits carrying a poor solution from said degasser to said resorber; a third one of said conduits carrying a rich solution from said resorber to said degasser, a first heat exchanger inserted into high-pressure-side sections of said second and third conduits, respectively; said degasser being connected to a duct for feeding the moist exhaust air thereinto from the dryer; said resorber having a steam outlet connected to a process steam line to an inlet of the dryer; at least one second heat exchanger in a section of said third conduit between said first heat exchanger and throttling means, in said section the rich solution is cooled by ambient air which is heated and fed to said dryer; means for supplying said ambient air to said first heat exchanger and means for feeding said heater air to said dryer; a first branch line for rich solution extending from a section of the conduit between the resorber and said at least one second heat exchanger and back into said section of the conduit between the heat exchanger and the throttling means, and at least one third heat exchanger in said branch line and connected, as regards flow of the ambient air to said dryer, in series with the at least one second heat exchanger, by means for feeding said heated air from said first heat exchanger to said second heat exchanger; a second branch line between the low-pressure side of the degasser and the process steam line, control means in said second branch line for switching steam from the process steam line into said second branch line in the event of a brief shut-down of the paper making machine.

7. The combination according to claim 6, wherein said control means includes an overflow valve operable by steam pressure rising when steam fed to the paper making machine in the process steam line is shut off.

8. The combination according to claim 6, wherein the degasser has a jacket space, a plurality of steam discharging nozzles substantially uniformly distributed in said jacket space and connected to said second branch line, set opposite, and at a short distance from, surfaces to be fed with waste heat or steam.

9. The combination according to claim 1 or 6, for starting up or restarting of the paper making machine after a relatively long shut-down when the heat pump is shut off, comprising: a heating unit heatable with natural gas, light heating oil or other fossil fuel, for heating air to be fed to the degasser when the paper making machine is started, until waste heat is available from the restarted paper machine.

* * * * *